US010083586B2

(12) United States Patent
Parma

(10) Patent No.: US 10,083,586 B2
(45) Date of Patent: Sep. 25, 2018

(54) RFID AND/OR RFID/EM ANTI-THEFT RADIO FREQUENCY DETECTION DEVICE

(71) Applicant: NTL S.R.L., San Bonifacio (IT)

(72) Inventor: Gianluca Parma, Vicenza (IT)

(73) Assignee: NTL S.R.L., San Bonifacio (IT)

( * ) Notice: Subject to any disclaimer, the term of this patent is extended or adjusted under 35 U.S.C. 154(b) by 0 days.

(21) Appl. No.: 15/563,863

(22) PCT Filed: Mar. 21, 2016

(86) PCT No.: PCT/IT2016/000068
§ 371 (c)(1),
(2) Date: Oct. 2, 2017

(87) PCT Pub. No.: WO2016/157226
PCT Pub. Date: Oct. 6, 2016

(65) Prior Publication Data

US 2018/0075722 A1 Mar. 15, 2018

(30) Foreign Application Priority Data

Apr. 2, 2015 (IT) ........................ 102015000010771

(51) Int. Cl.
*G06K 5/00* (2006.01)
*G08B 13/24* (2006.01)
(Continued)

(52) U.S. Cl.
CPC ..... *G08B 13/2471* (2013.01); *G08B 13/2414* (2013.01); *G08B 13/2437* (2013.01);
(Continued)

(58) Field of Classification Search
CPC ............ G08B 13/2408; G08B 13/2471; G08B 13/2474
(Continued)

(56) References Cited

U.S. PATENT DOCUMENTS 4,260,990 A 4/1981 Lichtblau
5,103,235 A * 4/1992 Clemens .................. H01Q 7/04
340/572.7
(Continued)

FOREIGN PATENT DOCUMENTS

DE 3844848 C2 11/1995
DE 19940087 A1 3/2001
(Continued)

OTHER PUBLICATIONS

Search Report and Written Opinion dated Jul. 6, 2016 of corresponding International application No. PCT/IT2016/000068; 11 pgs.

(Continued)

*Primary Examiner* — Seung Lee
(74) *Attorney, Agent, or Firm* — Maier & Maier, PLLC

(57) ABSTRACT

A radio frequency detection device to detect RFID tags. A single double-loop RFID antenna, an RFID reader, connection cables, longitudinal conductive section bars and transverse conductive section bars which form a closed circuit. A transverse branch connecting the longitudinal section bars so as to form a double-loop circuit which is crossed by current and which provides an electromagnetic field able to detect, in three dimensions, RFID tags even on both sides of a single panel of antennas. The possibility of superimposing an RFID antenna, with other antennas with electromagnetic technology allows to obtain a hybrid gate with a simultaneous reading of RFID tags and electromagnetic tags or bars.

7 Claims, 6 Drawing Sheets

(51) Int. Cl.
*H01Q 1/44* (2006.01)
*H01Q 1/22* (2006.01)

(52) U.S. Cl.
CPC ..... *G08B 13/2442* (2013.01); *G08B 13/2474* (2013.01); *G08B 13/2488* (2013.01); *H01Q 1/2216* (2013.01); *H01Q 1/44* (2013.01)

(58) Field of Classification Search
USPC .......................................................... 235/492
See application file for complete search history.

(56) References Cited

U.S. PATENT DOCUMENTS

| | | | | |
|---|---|---|---|---|
| 6,836,216 | B2 * | 12/2004 | Manov | G08B 13/2408 340/572.4 |
| 7,046,208 | B2 * | 5/2006 | Shishido | G06K 7/10336 343/742 |
| 7,495,565 | B2 * | 2/2009 | Oakes | G08B 13/2471 340/572.6 |
| 8,854,188 | B2 * | 10/2014 | Stewart | G06K 7/0008 340/10.1 |
| 9,461,354 | B2 * | 10/2016 | Gunter | H01Q 7/00 |

FOREIGN PATENT DOCUMENTS

| | | | |
|---|---|---|---|
| FR | 2553523 | A1 | 4/1985 |
| FR | 2809279 | A1 | 11/2001 |
| WO | 89/04977 | A1 | 6/1989 |
| WO | 2005057725 | A1 | 6/2005 |

OTHER PUBLICATIONS

Search Report and Written Opinion dated Dec. 3, 2015 of corresponding Italian application No. 102015000010771; 9 pgs.

* cited by examiner

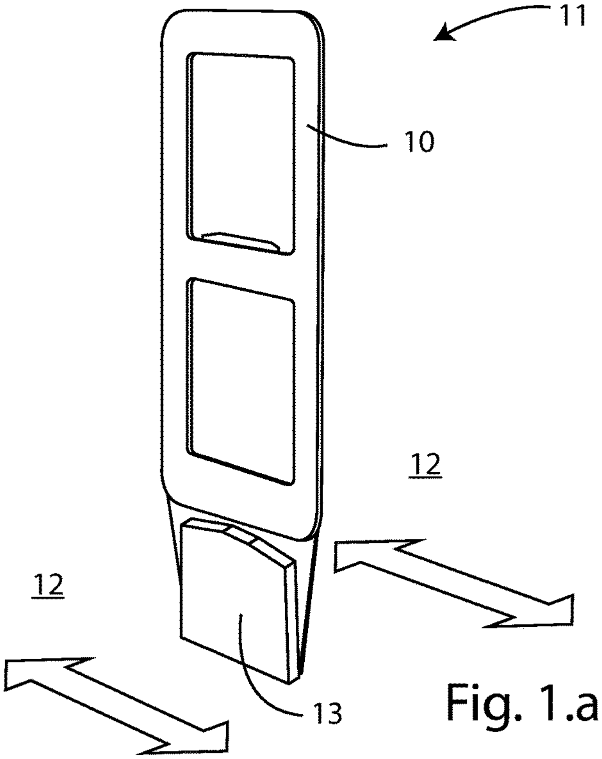
Fig. 1.a
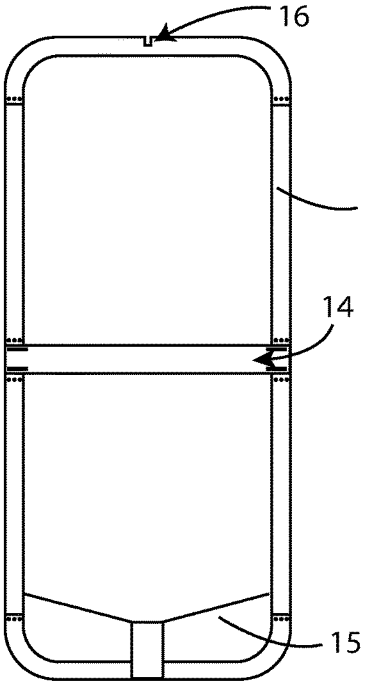
Fig. 1.b

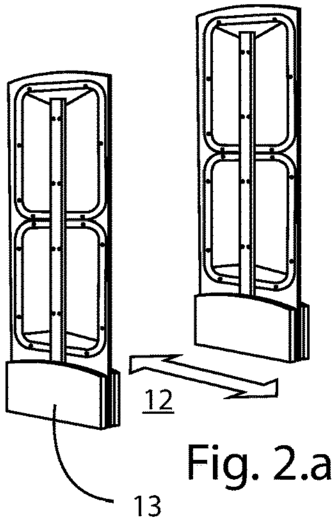
Fig. 2.a
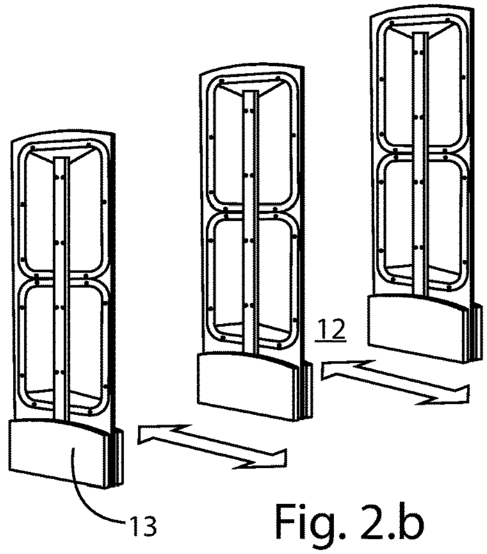
Fig. 2.b
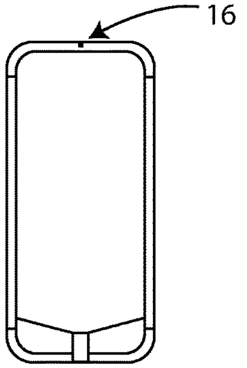
Fig. 2.c
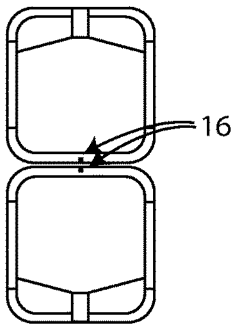
Fig. 2.d
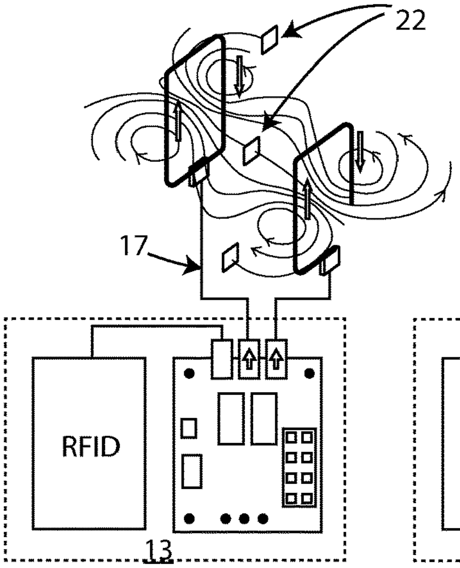
Fig. 2.e
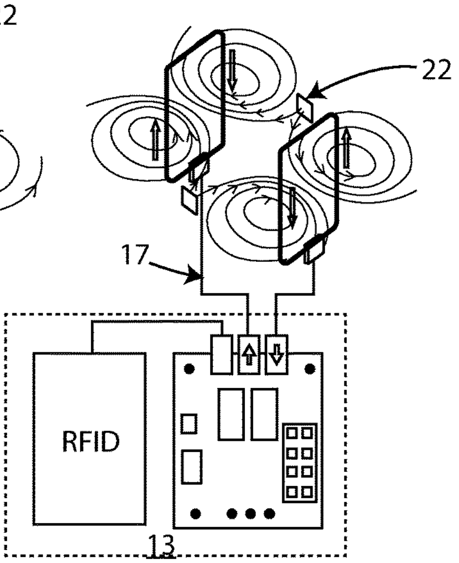
Fig. 2.f

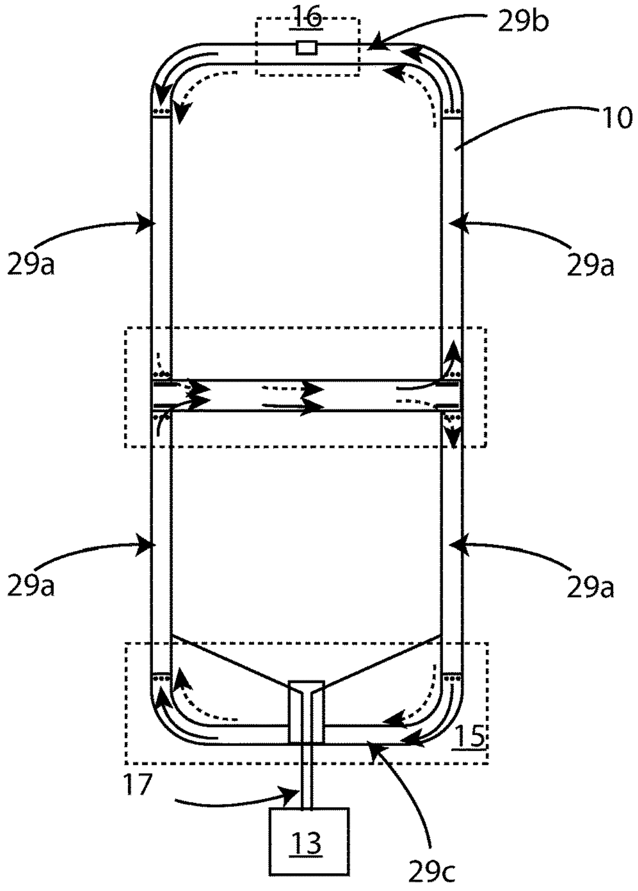
Fig. 3.a
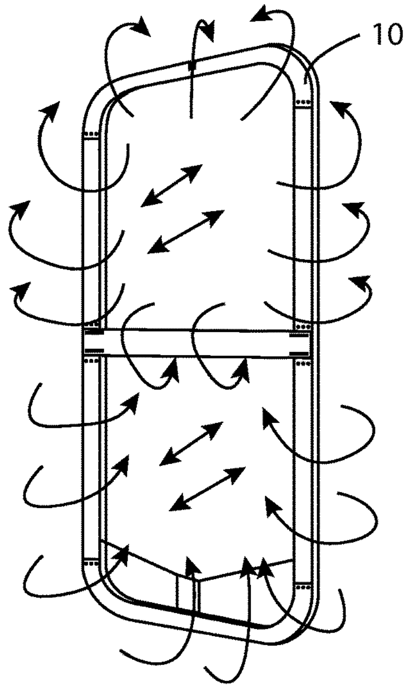
Fig. 3.b

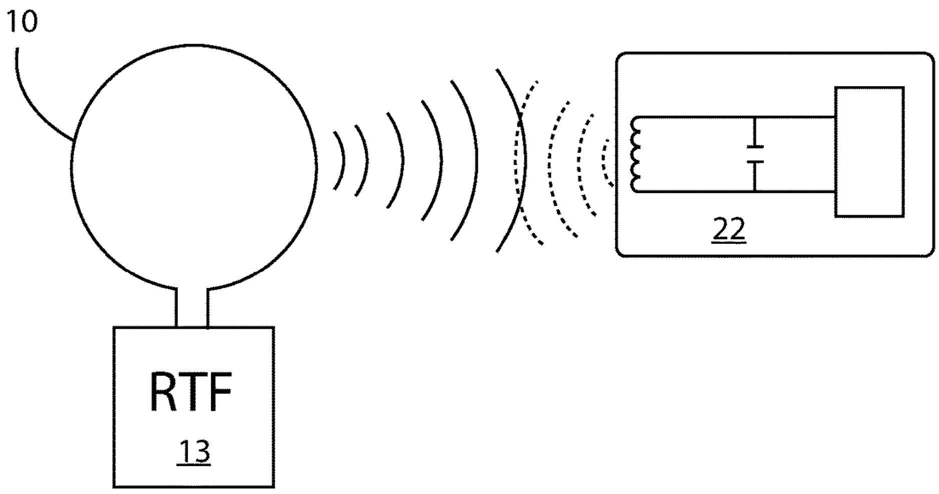
Fig. 4
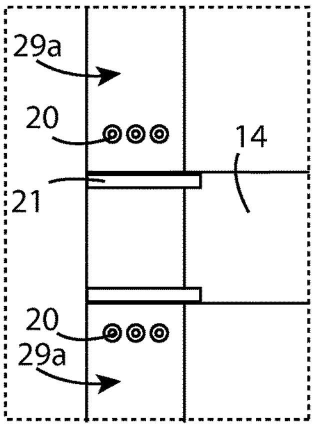
Fig. 5.a
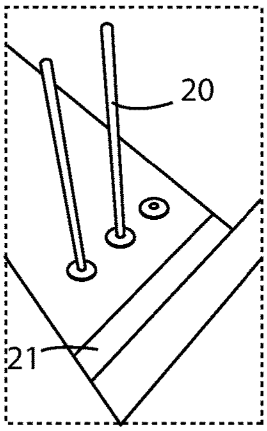
Fig. 5.b
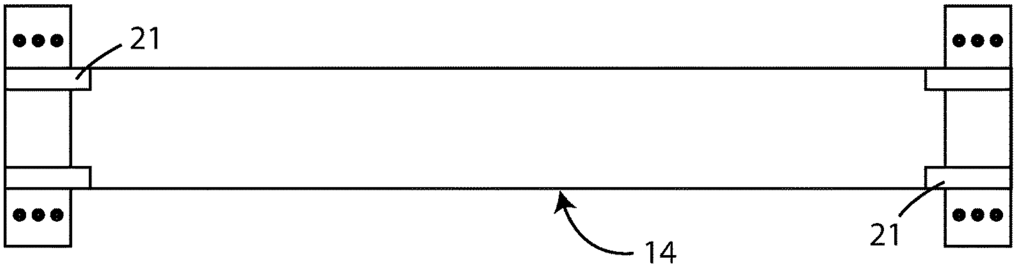
Fig. 5.c

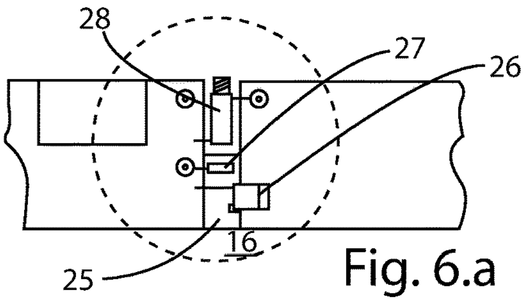
Fig. 6.a
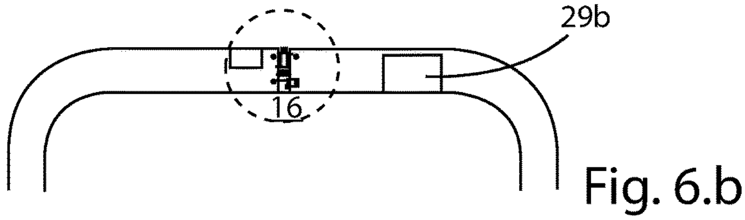
Fig. 6.b
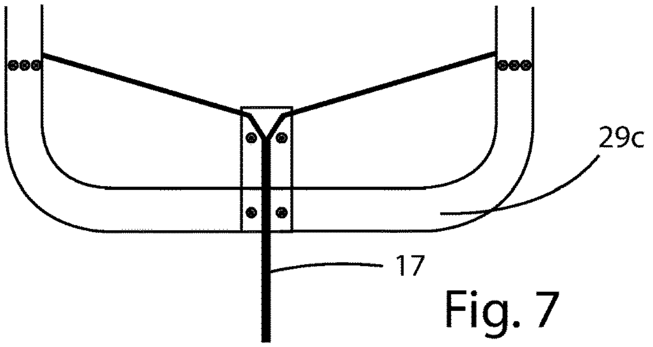
Fig. 7
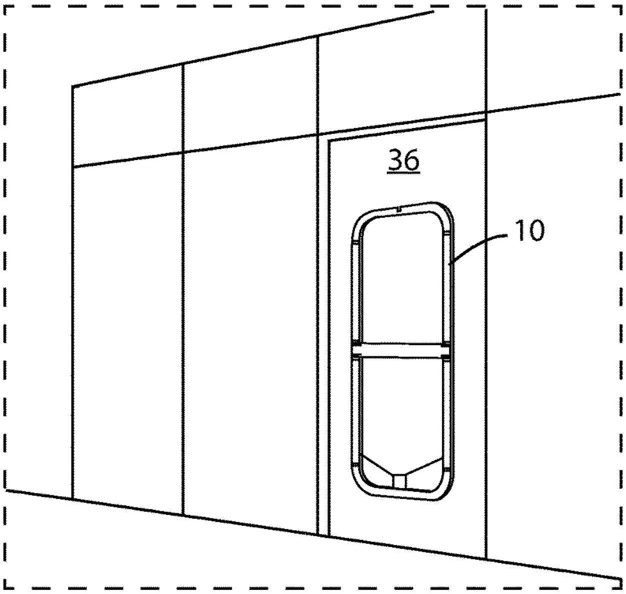
Fig. 8.a
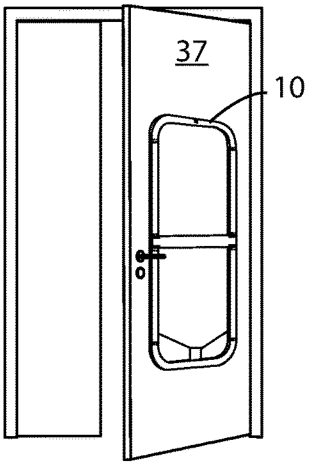
Fig. 8.b

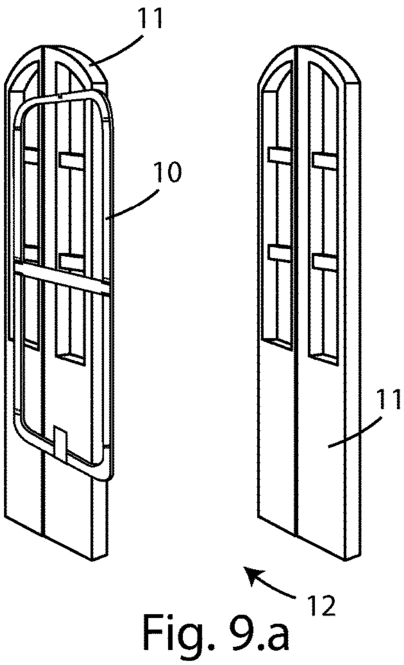
Fig. 9.a
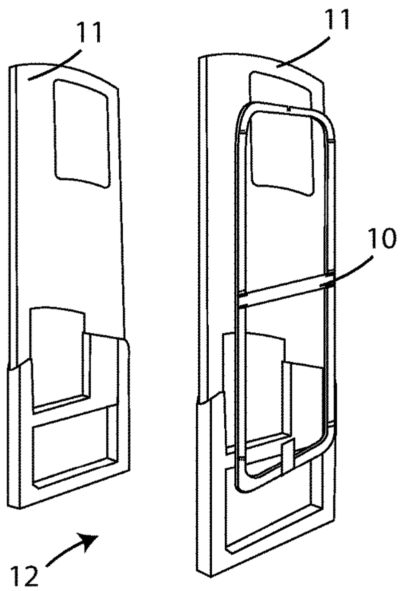
Fig. 9.b
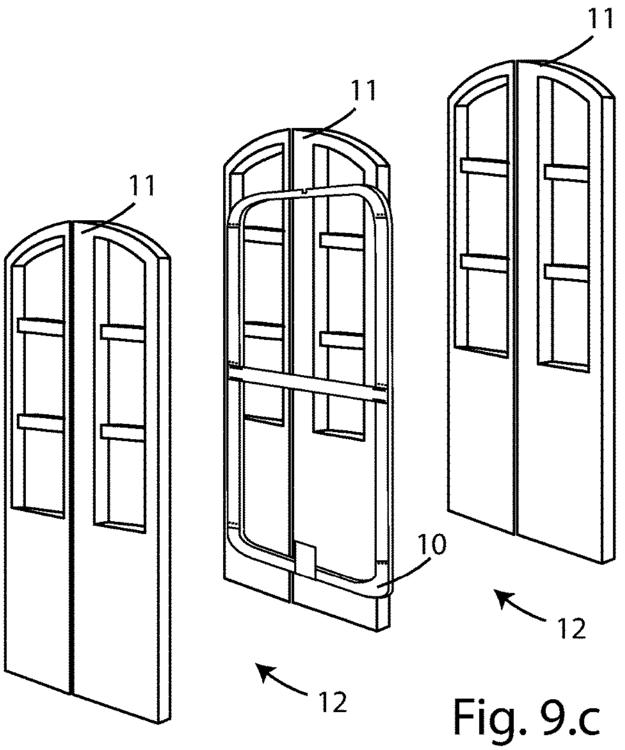
Fig. 9.c

RFID AND/OR RFID/EM ANTI-THEFT RADIO FREQUENCY DETECTION DEVICE

FIELD

The present invention generally refers to a new RFID detection device with a RFID and/or hybrid RFID/EM anti-theft function.

In particular, the present invention relates to a single antenna RFID detection device (Radio Frequency IDentification) which employs radio frequency identification technology and which comprises a single panel with a particular antenna capable of detecting the passage of RFID tags on both sides of said panel.

Therefore the present invention is in the field of radio frequency detection systems (RFID) which are currently used, for example, in libraries.

Nowadays, in order to ensure an effective detection of products passing through a security gate, at least two or three antennas, which are integrated inside related panels arranged opposite one another, are commonly used.

BACKGROUND

The risk of theft in libraries, as in other public places, was and still is controlled and limited by means of systems generically belonging to the "electromagnetic technology", which is able to detect when a book or another product passes through a safety gate without prior authorization.

The electromagnetic technology detects the passage of a product through a security gate, but is not able to identify the product.

In recent years, the electromagnetic systems (EM) have been overcome by the radio frequency identification systems (RFID), since the latter systems allow a greater efficiency, the best performance and an accurate identification of the product passing through.

Although a phase of replacement of said electromagnetic technology systems with the most advanced RFID technology is beginning, however a large number of systems operating with a non-RFID electromagnetic technology are now installed and used in the world.

For example, it is possible to estimate that around 200,000 non-RFID systems are now employed in the library sector.

Currently, an anti-theft door is generally formed by at least two antennas, which are integrated inside panels mounted and fixed to the ground; said panels contain the detection system.

Some labels (electronic labels in case of RFID technology or barcode labels in case of electromagnetic technology) are applied on the products to control and, if said labels are not deactivated, they triggers an alarm when passing through a security gate. On the contrary, if said labels are disabled, they will not trigger the alarm in any way.

The anti-theft security gate is normally placed at the exit of the library, of the store or, in general, of the area inside of which the products must be controlled.

The automatic detection of products by means of radio frequency identification is based on a technology that has evolved from the classical barcode and which uses radio waves to identify, locate or certify materials or objects.

When an RFID tag enters a detection area of the antenna, said tag receives, by means of magnetic induction, the energy needed to provide the information concerning recognition.

The so-called passive systems, which have no power supply inside the RFID electronic recognition label, are generally composed of two main elements:

a) a transponder (electronic label) and b) a radio frequency reader with a corresponding digital reading/writing antenna.

The transponder or electronic label is composed in turn by an internal antenna, a silicon microchip that includes a basic modulation circuitry and a memory.

This label is coupled to the object to be controlled and recognize (such as a book, a multimedia product, i.e. CDs, DVDs, cassettes, etc, or other).

The energy required to allow the transponder to operate is provided by electromagnetic induction from a radiofrequency field called "carrier"; said field is transmitted by an RFID reader, since, passing through the loops of an antenna, an electromagnetic field generates a DC voltage.

Therefore, the information stored in the transponder (i.e. the electronic label) will be transmitted to the reader, which will be able to accurately identify the object or the product on which the label is placed.

At a frequency equal to 13.56 MHz, for example, the physical distance within which the detection can occur varies from a few mm to about 1-2 meters.

The above mentioned systems are also used with an anti-theft feature, by means of information transcribed in digital mode in the memory of the electronic label, thus allowing to receive an authorization to leave the building or to trigger the alarm in an "ON" position.

The RFID transponder is generally a small component, which is made in form of an adhesive label incorporating several components:

- a silicon memory;
- miniaturized electronic components for RF modulation and transmission;
- metal loops, usually made of aluminum or copper, acting as an antenna.

Said loops are made by means of special procedures in order to obtain a very thin, flexible and extremely compact device.

Generally speaking, the RFID reader is an electronic micro-controller combined with a radio frequency modulation device, which, by means of antennas, sends energy to a transponder and then reads the information received by magnetic modulation.

Said unit, also having an anti-theft feature, is able to control the digital information; in practice, the reader generates the so-called "carrier" frequency and is controlled by a computer program, which is normally installed inside the unit.

The "carrier" is therefore a radio frequency generated by the reader to transmit energy to the transponder so as to be able to read information which are subsequently re-sent by said transponder, while a periodic amplitude modulation of the "carrier" signal is used to code the transmitted data; the frequency normally used for said system is 13.56 MHz.

The RF field generated by the reader has three tasks:

- generating power by electromagnetic induction in the transponder's antenna;
- synchronizing the signal transmission;
- recognizing the signals transmitted from the transponder.

It is also possible to read simultaneously more transponders, which are influenced by the field of radio frequencies emitted from the reader; said multiple-reading system is known as the so-called "anti-collision" technology.

According to the known structure, an anti-theft RFID gate must be formed from at least two detection devices, which are coupled with two or more panels, placed one opposite the other, inside of which the respective antennas are inserted.

The known RFID security gates have a current flowing in the antennas (which generates an electromagnetic field) with a direction which is unchanged and allows the following options:

- optimizing the parallel reading (as shown in the enclosed FIG. 2.*e*) with respect to the direction of the two antennas; this is obtained through the circulation of current in the antennas with the same direction ("in phase" current, FIG. 2.*e*);
- optimizing the perpendicular reading (FIG. 2.*f*); this is obtained with a current passing through the antenna in the opposite direction ("counter-phase" current, FIG. 2.*f*).

Therefore, known devices are able to operate very well only with respect to a specific placement of the electronic label.

In practice, the current RFID anti-theft devices have the drawback of requiring the installation of two or more panels integrating the antennas for controlling each single gate.

This drawback also implies expensive installation and system costs, since a plurality of panels of antennas must be installed.

Furthermore, the current known devices, since they require a plurality of series-connected panels, cannot be adapted to installations having different geometries.

Another limitation of the known devices is the need to provide a suitable plant for passing the connecting cables between the multiple panels of antennas constituting the detection system.

These drawbacks are particularly evident because the installation of many antennas in the opening area of the access doors frequently causes serious logistical problems.

SUMMARY OF THE DISCLOSURE

The present invention aims to overcome all the above mentioned drawbacks belonging to the known art.

A main object of the present invention is to provide a radio-frequency detection device which allows to simplify and economize the installation of security gates, with respect to the above mentioned known devices.

Within this aim, a further object of the present invention is to provide a device which is able to effectively detect RFID tags, which are everywhere positioned with respect to a single panel containing the antenna.

A further object is to provide a detection device which solves the space problems of the known systems.

Another object of the present invention is to provide a detection device which is able to operate detection systems already installed and operated with the electromagnetic technology and even with the RFID technology.

The above mentioned aims and objects, which will become more clear hereinafter, are obtained by a radio-frequency detection device.

Advantageously, the RFID system of the present application simplifies and solves the typical problems of space of the known systems.

Advantageously, the detection device according to the invention causes an electromagnetic field such as to allow the detection in three dimensions of RFID tags that are positioned everywhere with respect to the single panel containing the antennas.

Still advantageously, the radio-frequency detection device according to the invention allows the detection on three dimensions of RFID tags and on both sides of a single panel of antennas. The conformation of said device allows lower installation costs with respect to the prior art.

Still advantageously, the device according to the invention allows a considerable freedom of installation, for example when doorways or openings in general are provided.

Still advantageously, the present invention allows a simplification of installation, since, for example, contrary to the installation of known devices, a passage of cables between the different panels is not required.

Advantageously, the present invention allows to provide a "hybrid" operation, since the RFID technology and the EM technology can be simultaneously used.

In fact, the RFID system according to the present invention can be superimposed with double and triple antenna systems with electromagnetic technology, thus obtaining an effective and economical hybrid system, which allows to obtain a simultaneous reading of RFID anti-theft and electromagnetic labels or tags. To achieve this result, the present invention provides for using a single antenna with RFID technology, which is superimposed to the "electromagnetic" system on one of the two antennas which are already installed.

Advantageously, when used to integrate the electromagnetic technology, the present invention allows to operate without removing the EM anti-theft gate which has been previously installed.

Advantageously, the present invention is suitable for a gradual upgrade of detection systems, particularly in the case of a gradual transition to RFID technology. For example, libraries are able to simultaneously use, on their books, anti-theft tags with both said security technologies (EM and RFID).

The invention according to the present invention also allows an economic advantage since it is possible to keep the products already protected by the electromagnetic technology during the gradual transition to RFID technology.

Still advantageously, the present application, together with a preexisting system based on the electromagnetic technology allows, for example, a full exchange of books between libraries that adopt the two different anti-theft technologies.

BRIEF DESCRIPTION OF THE DRAWING

Further characteristics and advantages of the present invention will become more clear from the following description of a preferred embodiment of the invention, shown in the enclosed drawings.

Said drawings, together with the following description, help to explain the principles of the invention.

In particular:

FIGS. 1.*a* and 1.*b* show a general diagram of the device according to the present invention;

FIG. 2.*a* shows an example of installation of known detection devices with two antennas;

FIG. 2.*b* shows an example of installation of known detection devices with three antennas;

FIG. 2.*c* shows the structure of known detection devices;

FIG. 2.*d* shows an example of a structure of known detecting devices;

FIG. 2.*e* shows the operation of known detecting devices;

FIG. 2.*f* shows the operation of known detecting devices;

FIG. 3.*a* shows an operating diagram of the device according to the invention;

FIG. 3.*b* shows a diagram of the magnetic field produced in the device according to the invention;

FIG. 4 shows the principle of operation of RFID technology, using passive transponders;

FIG. 5.*a* shows a technical detail of the device according to the invention;

FIG. 5.*b* shows another technical detail of the device according to the invention;

FIG. 5.*c* shows a detailed constructive diagram of the invention;

FIG. 6.*a* shows a detail of the upper part of the device according to the invention;

FIG. 6.*b* shows the upper part of the device;

FIG. 7 shows a detail of the lower part of the device;

FIG. 8.*a* shows a possible installation of the device according to the invention;

FIG. 8.*b* show a further possible installation of the device according to the invention;

FIG. 9.*a* shows the application of the device with an EM system with two gates;

FIG. 9.*b* shows the application of the device with an EM system with two gates;

FIG. 9.*c* shows the application of the device with an EM system with three gates.

DETAILED DESCRIPTION OF THE DRAWING

With reference to the attached drawings, a radio-frequency detection device, which is the object of the present invention, is globally indicated with 10.

It is to be noted that the use of double-sided printed circuits, described hereinafter and shown in the enclosed drawings, does not exclude the use of other construction technologies such as conductive cables and rods made of copper/aluminum.

Said detection device 10 has a transverse branch 14, which is arranged centrally and parallel with respect to a passage lane 12.

With particular reference to the enclosed FIG. 1, the general diagram of the system includes a single panel 11 of antennas with RFID technology for monitoring two passage lanes 12. In this diagram the sensing device 10 and the RFID reader 13 are placed inside a protection structure made of plexiglass.

The particular configuration of the device 10 allows to efficiently obtain, with a single detection device 10 integrated inside one panel 11 of antennas, the detection of an electronic RFID label or tag 22, wherever said label 22 is placed during the passage through the gate.

In particular, it is possible to detect a product along the three possible directions of passage of a label 22, i.e.:

in a direction parallel with the detection device;

in a transverse direction with respect to the detection device;

in a horizontal direction with respect to the passage.

This method of detection is called as the "method in three dimensions" or "3D".

The result is obtained thanks to the circuit shown in FIG. 3.*a*, since the current path in the circuit generates an appropriate electromagnetic detection field in the two loops of the device 10 (FIG. 3.*b*).

In particular, in FIG. 3.*a* the direction of the current that flows through the conductive circuits is indicated.

For a more clear and immediate comparison with the prior art, known system that are used up to date are shown in the enclosed figures from FIG. 2.*a* to FIG. 2.*f*; said system have a minimum of two panels 11 of antennas, which are arranged opposite one another.

In particular, in FIG. 2.*a* a configuration of two panels is shown and in FIG. 2.*b* a configuration of three panels is shown; FIG. 2.*c* and FIG. 2.*d* also show respective plans of currently known detection devices.

FIG. 2.*e* shows the operation of known detecting devices, in which the movement of the current in phase between the two antennas and the magnetic field pattern generated by said current are pointed out. Similarly, FIG. 2.*f* shows the operation of known devices, in which the movement of the current that is in counter-phase between the two antennas and the resulting magnetic field pattern are pointed out.

FIG. 2.*e* and FIG. 2.*f* show the same elements having the same function with the same reference numbers, in order to facilitate the understanding. With particular reference to FIG. 3.*a*, the main components of the device 10, according to a preferred embodiment, are:

an RFID dual-loop antenna;

a transverse branch 14;

a lower calibrating section (fixed tuning) 15;

an upper calibrating section (variable tuning) 16;

an anti-induction separating element 25 (FIG. 6.*a*);

an embodiment for fixing the antenna's portions with copper rivets 20 (FIG. 5);

several portions of the antenna embedded in double-sided printed circuits;

an RFID reader 13;

RFID cables 17.

The structure of the device 10 is formed by a double layer printed circuits made of copper or other conductive material and is composed of longitudinal section bars 29*a*, which are placed parallel between them and which are transversely connected by means of further section bars 29*b* and 29*c*, so as to form a closed circuit. The further combination of said section bars 29*a* with the transverse branch 14 substantially divides the circuit into two loops having a common branch.

The general system therefore comprises a double-loop antenna, with a reversal of current in a central position in order to ensure a passage of parallel currents also having the same direction.

This current's path inside the device 10 generates a detection electromagnetic field, shown schematically in FIG. 3.*b*, which is able to detect the passage of RFID labels or tags 22.

The detection electromagnetic flow which is produced in the upper circuit and in the lower circuit of the antenna, shown in FIG. 3.*b*, is obtained as a result of a parallel and simultaneous passage of the current in the central transverse branch 14.

Furthermore, the direction of the electromagnetic field produced in the central transverse branch 14 contributes to produce the magnetic flow either in the upper loop and in the lower loop.

The transverse branch 14 of the circuit and the calibrating sections 15 and 16 are innovative elements that allow the effective functioning of the system.

The transverse branch 14, preferably through a double-sided printed circuit and through non-conductive incisions 21 provided on both sides, allows the passage of current on the same transverse branch 14 simultaneously and in the same direction.

On the contrary, the current flows in a circular direction and in the opposite versus in the upper and lower loops.

The above mentioned features allow to obtain a general arrangement of the detection electromagnetic waves, FIG.

3.*b*, so as to obtain the three-dimensional reading of the RFID tags at distances of about 130-140 cm.

Said transverse branch 14 and the other antenna elements may also be made, according to alternative embodiments, with different technologies with respect to the double-sided printed circuit, such as conductive cables and rods made of copper/aluminum, however producing a parallel passage of current together with the corresponding connection bridges and the related currents having circular and opposite direction, respectively, in the upper loop and in the lower loop.

Therefore, according to the present invention, the detection device 10 has the transverse branch 14 which form a double-loop circuit. Said transverse branch 14 is common to the two loops and is provided for obtaining a passage of current along a parallel direction and along the same direction in the two antenna branches (the two sides of the double-side printed circuit made of copper).

Thanks to this feature, current's paths which would penalize the detection of electromagnetic waves are avoided.

FIG. 3.*a* generally shows the currents and the related versus in the antenna circuit.

The electronic control unit and the RFID reader 13 are located at the base of the panel 11, while the detection device 10 is connected to the RFID reader 13 via a radio-frequency cable 17.

The reader 13 transmits energy, by means of the antenna, to the RFID label or tag and then reads the information received from said label or tag.

The RFID reader 13 also contains a portion of electronic control for managing the whole system, which thus requires only electric cables and possibly PC Ethernet cables.

Preferably, double-side printed circuits made of copper (29*a*, 15, 14) are used, because they allow a parallel passage of the current in the two conductive faces, thus also increasing the electromagnetic yield.

An example of a preferred embodiment of the detecting device 10 made with double-side printed circuits (PCBs) made of copper is shown in the enclosed FIG. 5.

In particular, the connection between the individual parts of the circuit and the transverse branch 14 is preferably made with copper rivets 20 and with etchings of the layer of copper on both conductive sides of the layer (references 20, 21), so as to obtain a correct and parallel passage of current in the two parallel sides of the printed circuit.

In particular, the non-conductive incisions 21 on both sides of the layer allows a parallel passage (and in the same direction) of current along the central transverse branch 14.

Preferably, conductive rivets 20 are used. Other fastening technologies are technically similar and can be used, so as to achieve the same purposes.

FIG. 5.*c* shows in detail the non-conductive incision 21 on both sides of the layer.

It is therefore possible to obtain a very fine device; however, it is possible to use other constructive methods while maintaining the same concept of operation; for example it is possible to use conductive elements made of aluminum or flexible conductors made of copper.

Still with reference to the enclosed FIG. 3.*a*, the device 10 comprises specific control systems that allow the antenna electrical resonance at a frequency of 13.56 MHz with a suitable quality factor.

In particular, the device 10 is provided with a fixed lower calibrating section 15 and with an upper RF calibrating section 16 having a variable capacitive element and a fixed resistive element.

An example of an upper calibrating section 16, which is located at the top of the device 10, is shown in the enclosed FIG. 6.*a*.

The upper calibrating section 16 is composed of a fixed resistor 26, a fixed capacitor 27 and a variable capacitor 28.

The construction technique which provides for separating the conductive loop 25 allows a lower degree of interference when metal loops or similar structure are provided nearby (for example, the metal frame of the doors).

The construction technique of the upper section of the antenna which provides said conductive separation, shown in detail in FIG. 6.*a*, avoids the electromagnetic induction with other antennas and allows the application of the present invention in a hybrid function.

The special construction technology of the antenna's upper section having a conductive separation, shown in FIG. 6.*a*, elements 25, 16, allows the antenna to be superimposed or placed side by side with very limited distances to other detection antennas, such as the electromagnetic antennas, thus obtaining an "hybrid" operating state (FIG. 9A, FIG. 9B, FIG. 9*c*) for important applications.

In fact, without said conductive separation, conductive parasitic inductions between the two antennas (the electromagnetic antenna and the RFID antenna) could be produced with consequent overheating and damage of said antennas.

Finally, the radio-frequency detection system 10 according to the invention detects on both its sides the passage of RFID electronic tags 22 and may be used to replace the triple configuration.

When an RFID tag 22 enters the detection zone of the device, it receives, via magnetic induction, the energy required to provide the details of the product's identification; thus, the information stored in the electronic tag will be transmitted to the reader 13, which enables to accurately identify the labeled object or product.

The RFID system according to the present invention also allows the detection of electronic RFID tags 22 placed in any position with respect to the panel 11 and by using a single detection device 10.

These results are obtained thanks to the particular shape of the detecting device 10 and to the current path obtained by using the transverse branch 14.

The RFID antenna technology with a separation 25 of the loop at an upper portion also prevents the electromagnetic induction with the EM spiral antenna; it is thus possible to avoid mutual interference and the warming caused by the induction; it is also possible to obtain a simultaneous hybrid operation (FIG. 9A, FIG. 9B, FIG. 9*c*).

The features of the radio-frequency detection device according to the present invention are clear from the above description, as well as the resulting advantages are also clear.

Finally, it is clear that the above-mentioned device can be realized according to different embodiments, all falling in the scope of protection of the enclosed claim 1.

For example, the antenna can be built with different conductive elements with respect to the double-side printed circuit made of copper, obtaining in any case the same current's path.

The device according to the invention can also be integrated, for example, in a glass door 36 or in a wooden door 37, as respectively shown in FIG. 8.*a* and FIG. 8.*b*.

The device can also be integrated in structures or panels of different materials, such as plexiglass or non-conductive wooden materials.

The device can also be directly integrated and/or superimposed to other antennas and systems that use electromagnetic technology so as to enable an hybrid functionality (FIG. 9A, FIG. 9B, FIG. 9*c*).

Finally, the device according to the invention can find many applications, for example in retail outlets or in other types of public places.

The invention thus conceived is, in any case, susceptible of numerous modifications and variations, all falling within the protective scope of the appended claims.

Finally, all the details may be replaced with other technically equivalent elements and the materials employed, as well as the shapes and the dimensions, may be different depending on the contingent requirements and with reference to the state of the art.

The invention claimed is:

1. A radio frequency detection device configured to detect RFID tags, comprising:

a RFID antenna, an RFID reader, connection cables and longitudinal section bars which form a single closed circuit together with transverse section bars, said detecting device further comprising a transverse branch connecting said longitudinal section bars so as to form a double-loop circuit in which said transverse branch is common to two adjacent loops, wherein said transverse branch comprises a double-side printed circuit and non-conductive engravings which are provided on both sides thereof, so that electrical currents simultaneously flow in a same direction along said transverse branch, while electrical currents circularly flow towards opposite directions along said adjacent loops, wherein a single coil goes through said adjacent loops forming said single closed circuit and the same current flows in said single coil;

further comprising a first calibrating section or a fixed tuner, placed in the lower part of the device, and a second calibrating section or a variable tuner, placed in the upper part of the device, which are configured as an electrical resonance circuit operating at a given resonance frequency.

2. The radio frequency detection device according to claim 1, further comprising:

an anti-induction separation element placed in the upper section of said antenna, so that the device can be used in addition to an electromagnetic device.

3. The radio frequency detection device according to claim 1, wherein said double-loop circuit is formed by double-side printed circuits made of conductive material.

4. The radio frequency detection device according to claim 1, further comprising:

double-side printed circuits which are fixed between said adjacent loops by rivets and which have engravings of a copper layer on both the conductive sides.

5. The radio frequency detection device according to claim 1, wherein said device is integrated with a single panel of antennas.

6. The radio frequency detection device according to claim 1, wherein said device is installed at a security gate.

7. The radio frequency detection device according to claim 1, wherein said device is installed at access doors.

* * * * *